United States Patent
Wang et al.

(10) Patent No.: US 9,323,810 B2
(45) Date of Patent: *Apr. 26, 2016

(54) CURATION SELECTION FOR LEARNING

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 140 days.

This patent is subject to a terminal disclaimer.

(21) Appl. No.: 14/013,131

(22) Filed: Aug. 29, 2013

(65) Prior Publication Data

US 2015/0066918 A1    Mar. 5, 2015

(51) Int. Cl.
*G06F 17/30* (2006.01)

(52) U.S. Cl.
CPC .................................. *G06F 17/3053* (2013.01)

(58) Field of Classification Search
None
See application file for complete search history.

(56) References Cited

U.S. PATENT DOCUMENTS

| | | | |
|---|---|---|---|
| 6,507,830 B1* | 1/2003 | Liu | G06F 17/30707 706/48 |
| 8,645,394 B1* | 2/2014 | Kolak | G06F 17/3071 707/748 |
| 8,825,759 B1* | 9/2014 | Jackson | H04L 67/02 705/14.69 |
| 2007/0239778 A1* | 10/2007 | Gallagher | G06F 17/30244 |
| 2014/0280564 A1* | 9/2014 | Darling et al. | 709/204 |

OTHER PUBLICATIONS

N. Yen et al., "Ranking Metrics and Search Guidance for Learning Object Repository", IEEE Transactions on Learning Technologies, vol. 3 Issue 3, Jul. 2010.
X. Ochoa et al., "Relevance Ranking Metrics for Learning Objects", IEEE Transactions on Learning Technologies, vol. 1 Issue 1, Jan. 2008.

* cited by examiner

*Primary Examiner* — Son T Hoang
(74) *Attorney, Agent, or Firm* — Maschoff Brennan

(57) ABSTRACT

A method of ranking curations includes receiving a query. The method also includes calculating, based on the query, a content similarity measurement for each of multiple curations. The method also includes extracting, from each of the curations, multiple curation-specific features. The method also includes calculating a curation credit measurement for each of the curations based on the extracted curation-specific features. The method also includes ranking each of the curations based on the corresponding content similarity measurement and the corresponding curation credit measurement.

20 Claims, 4 Drawing Sheets

CURATION SELECTION FOR LEARNING

FIELD

The embodiments discussed herein are related to curation selection for learning.

BACKGROUND

Curation learning refers to learning from curations created by curators. Curations may include value-added lists of items, such as digital files, that are well-organized by the curator. Each curation may combine existing content with new perspectives. For example, a curation for learning a topic of interest may include items such as a web page describing the topic and one or more videos of introductory training for the topic, each taught by different instructors. Although such items may not exist together in each of their respective source locations on the Internet or other network, a curator may organize and group the items together in a curation to provide the curator's perspective on learning the topic of interest. A relatively large and increasing volume of curations available to users may make it difficult for users to search for and select appropriate curations for learning.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of ranking curations includes receiving a query. The method also includes calculating, based on the query, a content similarity measurement for each of multiple curations. The method also includes extracting, from each of the curations, multiple curation-specific features. The method also includes calculating a curation credit measurement for each of the curations based on the extracted curation-specific features. The method also includes ranking each of the curations based on the corresponding content similarity measurement and the corresponding curation credit measurement.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Standard curation engines allow users to search for and select items for inclusion in curations. In general, standard curation engines are not optimized for learning and/or are not optimized with curation-specific features. Open courseware (OCW) searches focus on crawled open education resources (hereinafter "OERs" or "OER resources") and allow users to search based on simple text content similarity. OCW searches are generally not optimized with learning-specific features. Moreover, OCW searches generally search original learning materials, rather than curations made up of learning materials and/or other items. Learning object repositories (LORs) are closed and manually maintained repositories that require manually input and structured metadata. LORs are not generally optimized with a structure of learning objects and item quality. Moreover, all items in each learning object typically come from the same source, whereas the items making up each curation may and often do come from diverse sources.

Embodiments described herein may search curations including curation items from diverse sources. Alternately or additionally, embodiments described herein may be optimized with curation-specific features and/or learning-specific quality of curation items included in the curations.

In an example embodiment, a content similarity measurement may be calculated for each of multiple curations based on a query received from, e.g., a user. Curation-specific features may be extracted from each of the curations. The curation items making up each of the curations may also be extracted from the curation, and curation-specific and learning-specific features may be extracted from the curation items. A curation credit measurement may be calculated for each of the curations based on the curation-specific features extracted from the curation. A curation item credit measurement may be calculated for each of the curations based on the curation-specific features extracted from the curation items making up the curation. A curation item learning credit measurement may be calculated for each of the curations based on the learning-specific features extracted from the curation items making up the curation. Each of the curations may then be ranked based on the corresponding content similarity measurement, the corresponding curation credit measurement, the corresponding curation item credit measurement, and the corresponding curation item learning credit measurement.

Embodiments of the present invention will be explained with reference to the accompanying drawings.

Figure 1A:
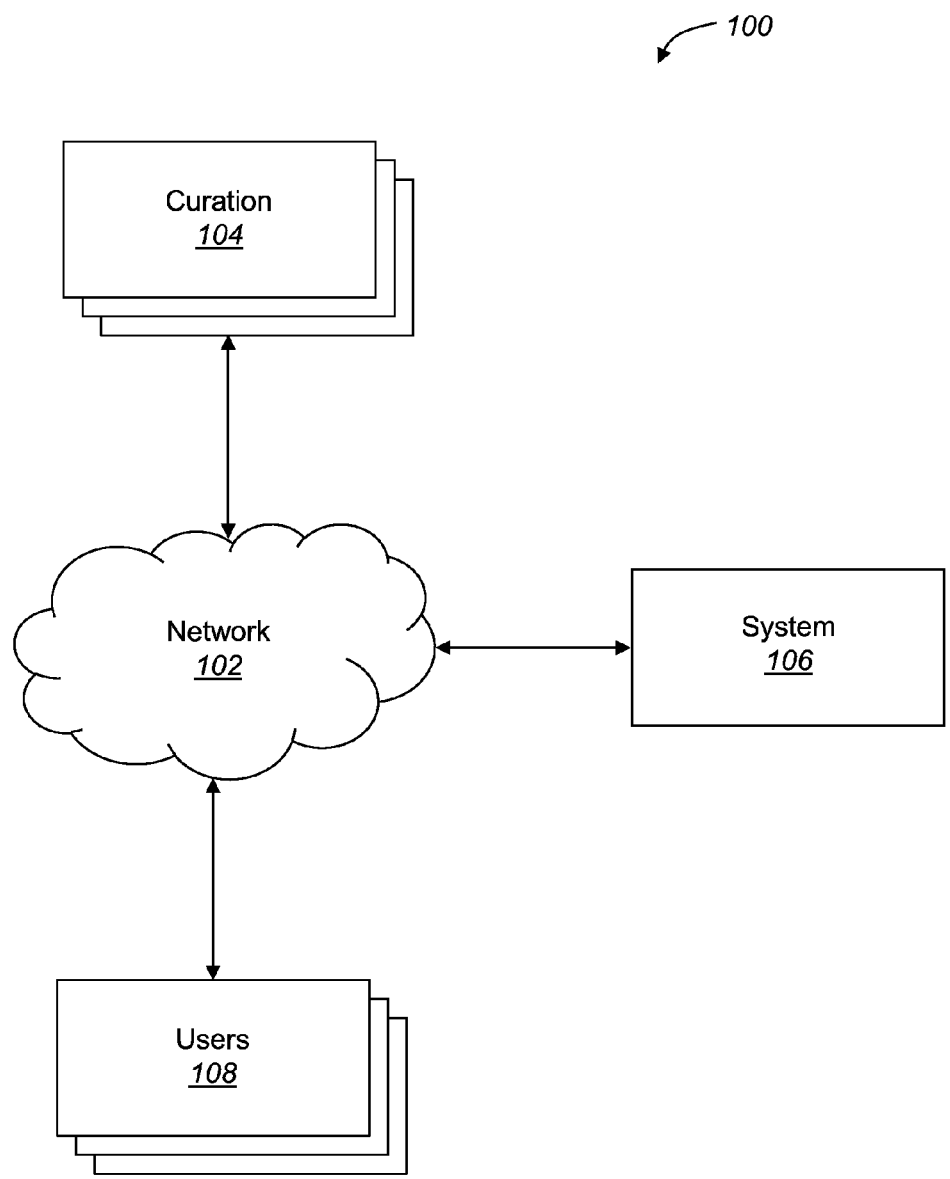
FIG. 1A is a block diagram of an example operating environment in which some embodiments may be implemented.

FIG. 1A is a block diagram of an example operating environment 100 in which some embodiments may be implemented. The operating environment may include a network 102, curations 104, a curation search and ranking system (hereinafter "system") 106, and one or more end users (hereinafter "user" or "users") 108.

In general, the network 102 may include one or more wide area networks (WANs) and/or local area networks (LANs) that enable the system 106, and/or the users 108 to access the curations 104 and/or to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

As used herein, a "curation" may include a value-added list of items, such as digital files, well-organized by a user or other entity referred to as a "curator." Accordingly, examples of items that may be included in the curations 104 include, but are not limited to, web pages, audio files, video files, electronic documents, and virtually any other digital files or content. An item included in any of the curations 104 may be hereinafter referred to as a curation item. The curations 104 may be accessible on websites hosted by one or more corresponding web servers communicatively coupled to the Internet, for example.

The users 108 include people and/or other entities that desire to find curations for learning from among the curations 104 that satisfy or match a particular query for inclusion in curations created by the users 108. Alternately or additionally, the users 108 may include people and/or other entities that desire to find curation items from among the curations 104 or other resources that satisfy or match a particular query for inclusion in curations created by the users 108. Example queries may include one or more keyword or search terms and/or requests to identify curations 104 that are similar or related to selected ones of the curations 104.

Although not separately illustrated, each of the users 108 typically communicates with the network 102 using a corresponding computing device. Each of the computing devices may include, but is not limited to, a desktop computer, a laptop computer, a tablet computer, a mobile phone, a smartphone, a personal digital assistant (PDA), or other suitable computing device.

Figure 1B:
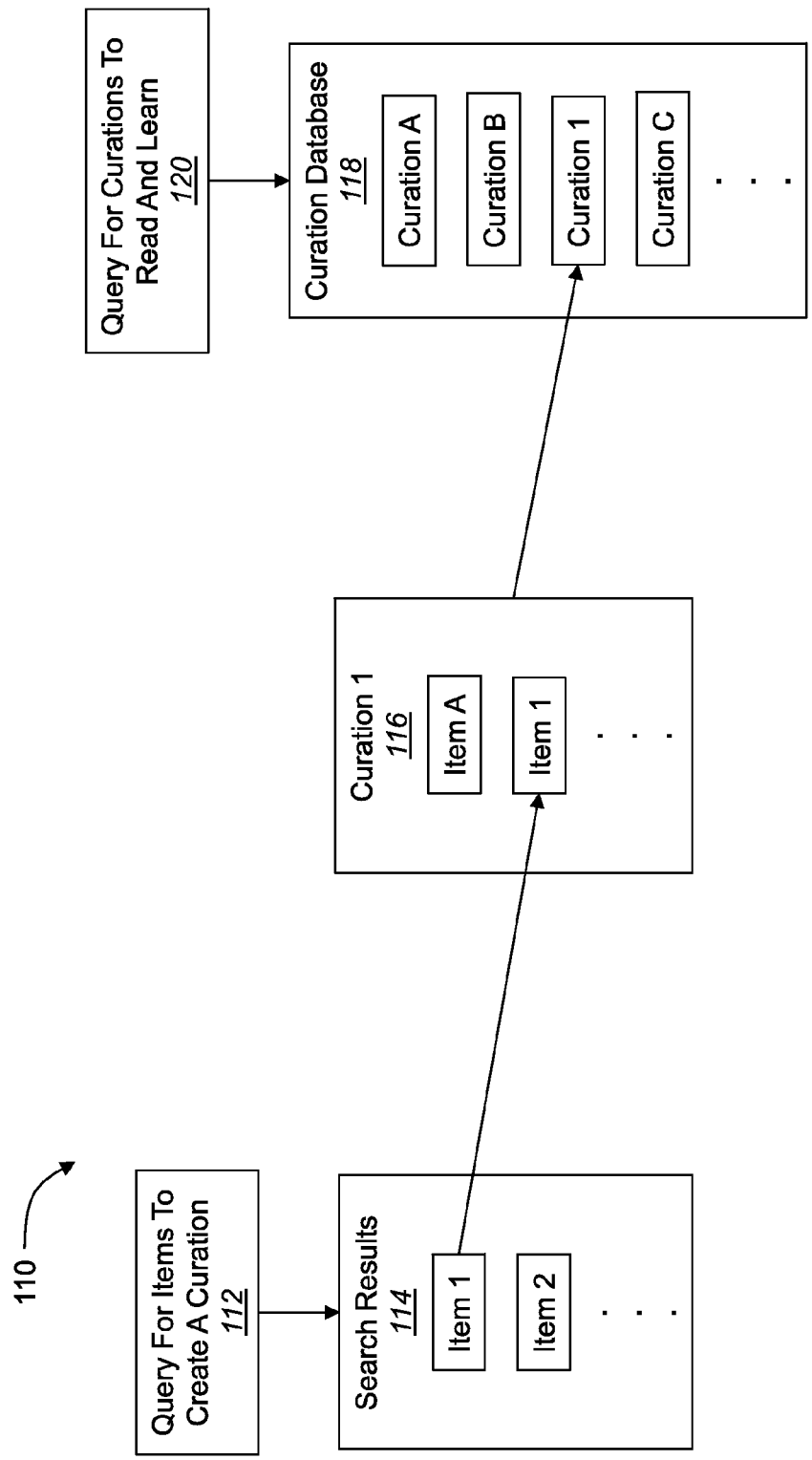
FIG. 1B shows an example flow diagram of a method of using a system included in the operating environment of FIG. 1A.

FIG. 1B shows an example flow diagram of a method 110 of using the system 106 of FIG. 1A, arranged in accordance with at least one embodiment described herein. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The method 110 of FIG. 1B will be discussed in combination with the operating environment 100 of FIG. 1A. The method 110 may begin at block 112 in which one of the users 108 queries for items to create a curation. In particular, the user 108 may query for items to include in a curation being created by the user 108.

The system 106 may search the curations 104 and/or other resources for items based on the query and curation-specific features. Optionally, the search may be further based on learning-specific features. In some embodiments, the system 106 performs a multi-level search including a web search in web resources, a search based on curation-specific features in curation resources such as the curations 104, and/or a search based on learning-specific features in open education resources (hereinafter "OERs" or "OER resources"). The system 106 outputs search results 114 including one or more items, such as "Item 1" and "Item 2," which may be ranked and unified based on scores from the multi-level search, as described in co-pending U.S. patent application Ser. No. 14/013,113 entitled ITEM SELECTION IN CURATION LEARNING and filed concurrently herewith. The foregoing application is incorporated herein by reference.

The user 108 may select any of the items in the search results 114, such as the "Item 1," to include along with one or more other items in a curation 116, "Curation 1," being created by the user 108.

As further illustrated in FIG. 1B, after the user 108 has completed adding items to the curation 116, the curation 116 may be saved in a curation database 118 along with one or more other curations that may collectively correspond to the curations 104 of FIG. 1A. At block 120, the method 110 may additionally include the same or another one of the users 108 querying the curation database 118 for curations to read and/or learn. Some embodiments described herein generally relate to the search for and selection of curations to read and/or learn.

Figure 2:
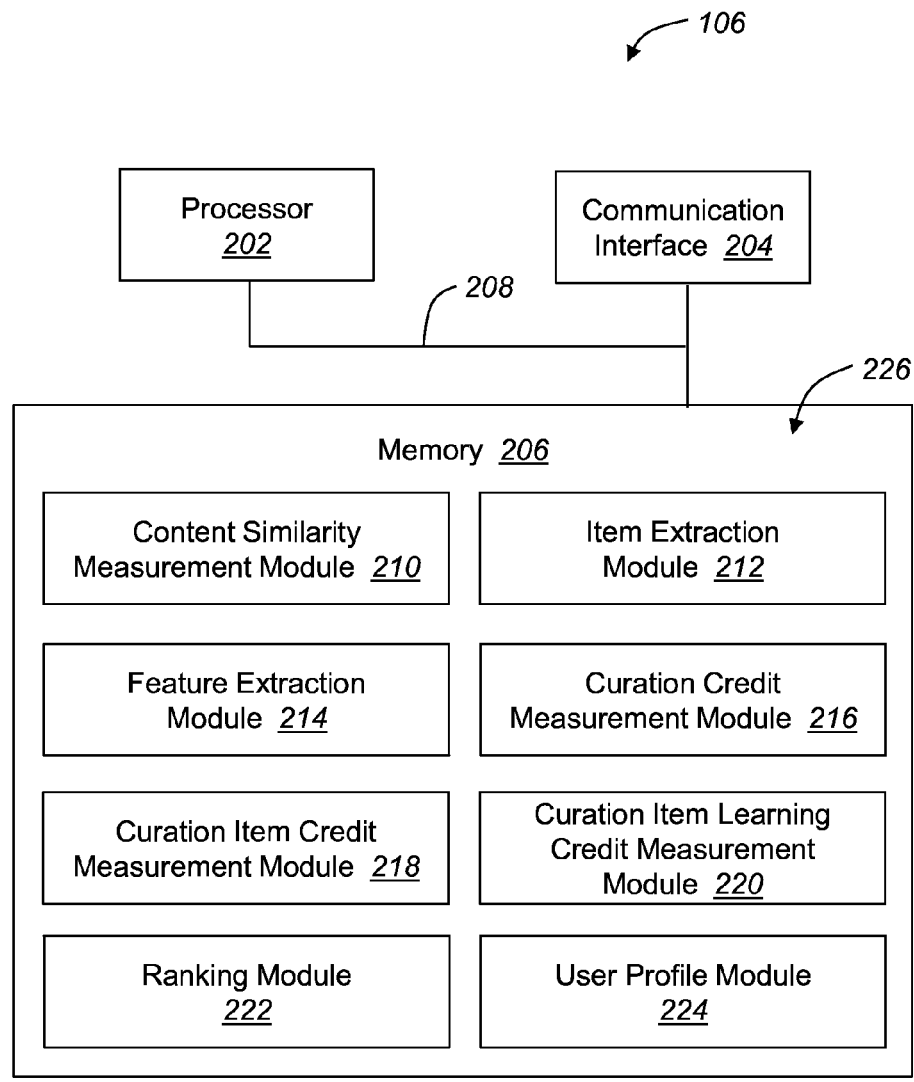
FIG. 2 is a block diagram of an example embodiment of the system of FIG. 1A.

FIG. 2 is a block diagram of an example embodiment of the system 106 of FIG. 1A, arranged in accordance with at least one embodiment described herein. As illustrated, the system 106 includes a processor 202, a communication interface 204, and a memory 206. The processor 202, the communication interface 204, and the memory 206 may be communicatively coupled via a communication bus 208. The communication bus 208 may include, but is not limited to, a memory bus, a storage interface bus, a bus/interface controller, an interface bus, or the like or any combination thereof.

In general, the communication interface 204 may facilitate communications over a network, such as the network 102 of FIG. 1A. The communication interface 204 may include, but is not limited to, a network interface card, a network adapter, a LAN adapter, or other suitable communication interface.

The processor 202 may be configured to execute computer instructions that cause the system 106 to perform the functions and operations described herein, such as receiving a query, calculating a content similarity measurement for each of multiple curations based on the query, extracting curation-specific features from the curations, calculating a curation credit measurement for each of the curations based on the extracted curation-specific features, and ranking each of the curations based on both the content similarity measurement and the curation credit measurement. The processor 202 may include, but is not limited to, a processor, a microprocessor (µP), a controller, a microcontroller (µC), a central processing unit (CPU), a digital signal processor (DSP), any combination thereof, or other suitable processor.

Computer instructions may be loaded into the memory 206 for execution by the processor 202. For example, the computer instructions may be in the form of one or more modules, such as, but not limited to, a content similarity measurement module 210, an item extraction module 212, a feature extraction module 214, a curation credit measurement module 216, a curation item credit measurement module 218, a curation item learning credit measurement module 220, a ranking module 222, and/or a user profile module 224 (collectively "modules 226").

In some embodiments, data generated, received, and/or operated on during performance of the functions and operations described herein may be at least temporarily stored in the memory 206. Moreover, the memory 206 may include volatile storage such as RAM. More generally, the system 106 may include a non-transitory computer-readable medium such as, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium.

The content similarity measurement module 210 may be configured to calculate a content similarity measurement for each of multiple curations, such as the curations 104 of FIG. 1, based on a query received from a user. The calculation of the content similarity measurement may additionally be based on a user profile associated with the user from which the query is received.

In these and other embodiments, the query and each of the curations may be represented as a term vector in a vector space model. For each curation i, a content similarity measurement, CSM_i, may be calculated according to the following formula:

$$CSM\_i=\text{Similarity}(q,d)=\cos(\theta), 0<\cos(\theta)<1,$$

where q is the term vector of the query, d is the term vector of the corresponding curation i, and $\cos(\theta)$ is the cosine of the angle $\theta$ between the term vectors q and d. When the content similarity measurement is additionally based on the user profile, a weight of terms in the term vector d that match keywords in the user profile, such as topics of interest in the user profile, may be boosted in the content similarity measurement for the corresponding curation.

The item extraction module 212 may be configured to extract curation items from each of the curations, including identifying at least some of the individual curation items making up each of the curations. For example, the item extraction module 212 may be configured to extract some or all of the curation items from each of the curations 104 of FIG. 1.

The feature extraction module 214 may be configured to extract curation-specific features from the curations and/or from the curation items extracted from the curations. The curation-specific features extracted for a given one of the curations may include, but are not limited to, a curator of the curation, feedback associated with the curation—such as number of views of the curation, number of bookmarks to the curation, number of comments associated with the curation, number of likes, or other feedback associated with the curation—a title of the curation, or the like or any combination thereof. The curation-specific features extracted from each of the curation items may include, but are not limited to, any of the curation-specific features extracted from a curation from which the curation item is extracted and already mentioned above, a title of the curation item, a content of the curation item, or the like or any combination thereof. Alternately or additionally, the curation-specific features extracted from a given curation may include any of the curation-specific features extracted from the curation items included in the curation.

The feature extraction module 214 may alternately or additionally be configured to extract learning-specific features from the curation items extracted from the curations. The learning-specific features extracted from each of the curation items may include, but are not limited to, an associated individual (e.g., a professor, instructor, or author of the curation item), a title of the curation item, a teaching or publication date of the curation item, an associated course or class in which the curation item is or was presented, an associated educational institution at which the course or class is or was taught, content of the curation item, and/or other learning-specific features as disclosed in co-pending U.S. patent application Ser. No. 13/731,996 entitled RANKING AND RECOMMENDATION OF OPEN EDUCATION MATERIALS and filed Dec. 31, 2012 (hereinafter the '996 application). The '996 application is herein incorporated by reference.

The curation credit measurement module 216 may be configured to calculate a curation credit measurement based on the curation-specific features extracted from the curations. In some embodiments, the curation credit measurement for each of the curations may depend on a popularity of the corresponding curation and on a popularity and social network influence of a curator of the corresponding curation. In an example embodiment, the curation credit measurement may be calculated according to the following formula:

$$\text{Curation\_Credit}\_i = \alpha_1 * \text{Curation\_Popularity}\_i + \beta_1 * \text{Curation\_Curator\_Credit}\_i,$$

where Curation_Credit_i is the curation credit measurement of a curation i, $\alpha_1$ and $\beta_1$ are constants, $\alpha_1 + \beta_1 = 1$, Curation_Popularity_i is a curation popularity credit measurement of the curation i, and Curation_Curator_Credit_i is a curation curator credit measurement of the curation i.

The curation credit measurement module 216 and/or another one of the modules 226 may be further configured to calculate the curation popularity credit measurement, or Curation_Popularity_i, of each curation i. The curation popularity credit measurement may depend on a popularity of the corresponding curation. In some embodiments, the curation popularity credit measurement of a curation i may be calculated according to the following formula:

$$\text{Curation\_Popularity}\_i = V * \text{View\_Score}\_i + B * \text{Bookmark\_Score}\_i + C * \text{Comment\_Score}\_i,$$

where V, B, and C are constants, V+B+C=1, View_Score_i is a view score of the curation i calculated based on a number of views of the curation i, Bookmark_Score_i is a bookmark score of the curation i calculated based on a number of bookmarks to the curation i, and Comment_Score_i is a comment score of the curation i calculated based on a number of comments to the curation i. More generally, the Curation_Popularity_i may be calculated as a sum of one or more feedback scores each multiplied by a corresponding feedback constant. Examples of feedback constants include the constants V, B, and C.

By way of example, suppose V=0.3, B=0.5, and C=0.2 for a given curation. Further suppose View_Score_i=0.05, Bookmark_Score_i=0.1, and Comment_Score_i=0.07 for the given curation. In this example, the Curation_Popularity_i of the given curation may be calculated consistent with the foregoing formula as Curation_Popularity_i=0.3*0.05+0.5*0.1+0.2*0.07=0.079. The foregoing values for V, B, and C are provided by way of example only and should not be construed as limiting. The foregoing values for View_Score_i, Bookmark_Score_i, and/or Comment_Score_i are also provided by way of example and not limitation and may be calculated according to any formula, some examples of which are provided below.

The curation credit measurement module 216 and/or another one of the modules 226 may be further configured to calculate View_Score_i, Bookmark_Score_i, and/or Comment_Score_i. The View_Score_i may reflect a popularity of a given curation i by views and may be calculated according to the following formula:

$$\text{View\_Score}\_i = \sum_{j=1}^{Ni1} e^{-\lambda 1(t-t_{j1})} / \sum_{i=1}^{M1} \sum_{j=1}^{Ni1} e^{-\lambda 1(t-t_{j1})},$$

where $\lambda 1$ is a constant factor for adjusting an impact of time on the View_Score_i, M1 is a number of total curations, Ni1 is a number of views of curation i, t is a current time, and $t_{j1}$ is a time of a jth view of the curation i in days or hours or any other desired units. In some embodiments, if the total number Ni1 of views of curation i is 0, then the View_Score_i may be equal to 0.

The Bookmark_Score_i may reflect a popularity of a given curation i by bookmarks to the curation and may be calculated according to the following formula:

$$\text{Bookmark\_Score}\_i = \sum_{j=1}^{Ni2} e^{-\lambda 2(t-t_{j2})} / \sum_{i=1}^{M2} \sum_{j=1}^{Ni2} e^{-\lambda 2(t-t_{j2})},$$

where $\lambda 2$ is a constant factor for adjusting an impact of time on the Bookmark_Score_i, M2 is a number of total bookmarked curations, Ni2 is a number of bookmarks to curation i, t is a current time, and $t_{j2}$ is a time of a jth bookmark to the curation i in days or hours or any other desired units. In some embodiments, if the total number Ni2 of bookmarks to curation i is 0, then the Bookmark_Score_i may be equal to 0.

The Comment_Score_i may reflect a popularity of a given curation i by comments to the curation and may be calculated according to the following formula:

$$\text{Comment\_Score\_}i = \sum_{j=1}^{Ni3} e^{-\lambda 3(t-t_{j3})} / \sum_{i=1}^{M3} \sum_{j=1}^{Ni3} e^{-\lambda(t-t_{j3})},$$

where $\lambda 3$ is a constant factor for adjusting an impact of time on the Comment_Score_i, M3 is a number of total commented curations, e.g., curations to which comments have been made, Ni3 is a number of comments to curation i, t is a current time, and $t_{j3}$ is a time of a jth comment to the curation i in days or hours or any other desired units. In some embodiments, if the total number Ni3 of comments to curation i is 0, then the Comment_Score_i may be equal to 0.

In some embodiments, $\lambda 1$, $\lambda 2$, and $\lambda 3$ may have the same value, or they may have different values. Alternately or additionally, based on the above formulas for View_Score_i, Bookmark_Score_i, and Comment_Score_i, each of View_Score_i, Bookmark_Score_i, and Comment_Score_i may be a normalized value between 0 and 1 for any given curation.

The above formulas for View_Score_i, Bookmark_Score_i, and Comment_Score_i relate to specific types of feedback including views, bookmarks, and comments of a curation i. The above formulas may be generalized for any type of feedback including views, bookmarks, comments, likes (e.g., as used in Facebook), pluses (e.g., as used in Google+), or other feedback. For example, a generic formula for calculating a feedback score may be of the following form:

$$\sum_{j=1}^{Ni} e^{-\lambda(t-t_j)} / \sum_{i=1}^{M} \sum_{j=1}^{Ni} e^{-\lambda(t-t_j)},$$

where $\lambda$ is a constant factor for adjusting an impact of time on the feedback score, M is a number of total curations having the specific type of feedback, Ni is a number of the specific type of feedback associated with the curation i, t is a current time, and $t_j$ is a time of a jth feedback event (e.g., application of the specific type of feedback) to the curation i in days or hours or any other desired units. In some embodiments, if the total number Ni of the specific type of feedback to curation i is 0, then the feedback score may be equal to 0.

The curation credit measurement module 216 and/or another one of the modules 226 may be further configured to calculate the curation curator credit measurement, or Curation_Curator_Credit_i, of each curation i. The curation curator credit measurement may depend on a popularity and a social network influence of the curator of the corresponding curation. In some embodiments, the curation curator credit measurement of a curation i may be calculated according to the following formula:

$$\text{Curation\_Curator\_Credit\_}i = CCP_i * SNI_i,$$

where $CCP_i$ is a curation content popularity of a curator of the curation i, and $SNI_i$ is a social network influence of the curator of the curation i.

In some embodiments, the curation curator credit measurement may be normalized on all curators. For example, suppose that the $CCP_i$ value and the $SNI_i$ value for the curator of the curation i are, respectively, 0.0378 and 0.01, such that a raw curation curator credit measurement is 0.00378 consistent with the foregoing formula for Curation_Curator_Credit_i. The raw curation curator credit measurement may be normalized across all curators, e.g., raw curation curator credit measurements may be calculated for all curators and the raw curation curator credit measurements may be summed; the raw curation curator credit measurement of 0.00378 may then be divided by the sum of raw curation curator credit measurements to obtain a normalized curation curator credit measurement between 0 and 1. For example, if the sum of raw curation curator credit measurements is 0.252, the normalized curation curator credit measurement corresponding to the raw curation curator credit measurement of 0.00378 may be calculated as 0.00378/0.252=0.015.

In these and other embodiments, the curation content popularity $CCP_i$ of the curator of curation i may be calculated as an average of all curation popularity credit measurements corresponding to all curations created by the curator of the curation i. More particularly, the curation content popularity $CCP_i$ may be calculated by extracting all curations created by the curator of the curation i, calculating the curation popularity credit measurement for each of the extracted curations created by the curator of the curation i as generally described above, calculating a total curation popularity credit measurement by summing the curation popularity credit measurements of the extracted curations created by the curator of the curation i, and calculating an average curation popularity credit measurement by dividing the total curation popularity credit measurement by a number of the extracted curations created by the curator of the curation i. The average curation popularity credit measurement may be used as the curation content popularity $CCP_i$ of the curator of the curation i.

Alternately or additionally, the social network influence $SNI_i$ of the curator of the curation i may be calculated based on a social feed following graph or other social graph algorithm or metric. Examples of social graph algorithms or metrics may include, but are not limited to, TwitterRank, Topic-specific PageRank, Topic-specific TunkRank, or the like or any combination thereof. Descriptions of the foregoing are provided in: U.S. patent application Ser. No. 13/242,352; "TwitterRank: Finding Topic-sensitive Influential Twitterers" by J. Weng et al. (accessed on Jul. 29, 2013 at http://ink.library.smu.edu.sg/cgi/viewcontent.cgi?article=1503&context=sis_research); and "Overcoming Spammers in Twitter—A Tale of Five Algorithms" by D. Gayo-Avello et al. (accessed on Jul. 29, 2013 at http://di002.edv.uniovi.es/~dani/downloads/CERI2010-camera-ready.pdf), all of which are incorporated herein by reference.

The curation content popularity $CCP_i$ and/or the social network influence $SNI_i$ of the curator of curation i may be calculated by the curation credit measurement module 216 and/or another one of the modules 226.

With continued reference to FIG. 2, the curation item credit measurement module 218 may be configured to calculate a curation item credit measurement for each of the curations based on the curation-specific features extracted from the curation items of the curations. In some embodiments, the curation credit measurement for each of the curations may depend on a popularity of curation items included in the corresponding curation and on a popularity and social network influence of each curator that has created a curation including any one or more of the curation items included in the corresponding curation. In an example embodiment, the curation item credit measurement may be calculated according to the following formula:

$$\text{Curation\_Item\_Credit\_}i = \sum_{m=1}^{INm} \text{Curation\_Item\_Score\_}m,$$

where Curation_Item_Credit_i is the curation item credit measurement of curation i, INm is a total number of curation items in the curation i, and Curation_Item_Score_m is a curation item score of each curation item m in the curation i.

The curation item credit measurement module 218 and/or another one of the modules 226 may be further configured to calculate the curation item score, or Curation_Item_Score_m, of each curation item m. In some embodiments, the curation item score may be calculated according to the following formula:

$$\text{Curation\_Item\_Score}\_m = \alpha_2 * \text{Item\_Popularity\_Credit}\_m + \beta_2 * \text{Item\_Curator\_Credit}\_m,$$

where $\alpha_2$ and $\beta_2$ are constants, $\alpha_2 + \beta_2 = 1$, Item_Popularity_Credit_m is a curation item popularity credit measurement of curation item m, and Item_Curator_Credit_m is an item curator credit measurement of the curation item m.

The curation item credit measurement module 218 and/or another one of the modules 226 may be further configured to calculate the curation item popularity credit measurement, or Item_Popularity_Credit_m, of each curation item m. The curation item popularity credit measurement may depend on a popularity of the curation item m. The curation item popularity credit measurement of curation item m may be calculated according to the following formula:

$$\text{Item\_Popularity\_Credit}\_m = \Sigma_{i=1}^{CN} \text{Curation\_Popularity}\_i / INi,$$

where CN is a number of curations that each include the curation item m, Curation_Popularity_i depends on a popularity of the curation i that includes the curation item m, and INi is a number of curation items included in the curation i. The same formula used for calculating Curation_Popularity_i described above in the context of calculating Curation_Credit_i may be used in the context of calculating Item_Popularity_Credit_m. Accordingly, the Curation_Popularity_i as used to calculate the Item_Popularity_Credit_m may be calculated by the curation credit measurement module 216, the curation item credit measurement module 218, and/or another one of the modules 226.

The curation item credit measurement module 218 and/or another one of the modules 226 may be further configured to calculate the item curator credit measurement, or Item_Curator_Credit_m, of each curation item m. The item curator credit measurement may depend on a popularity and social network influence of each curator that has created a curation including the curation item m. In some embodiments, the item curator credit measurement may be calculated according to the following formula:

$$\text{Item\_Curator\_Credit}\_m = \Sigma_{i=1}^{CN} \text{Curation\_Curator\_Credit}\_i / INi,$$

where CN is a number of curations that each include the curation item m, Curation_Curator_Credit_i is a curation curator credit measurement of the curation i as already defined above, and INi is a number of curation items included in the curation i.

In some embodiments, the item curator credit measurement may be normalized on all curators, in a manner similar to that discussed above with respect to the curation curator credit measurement.

With continued reference to FIG. 2, the curation item learning credit measurement module 220 may be configured to calculate a curation item learning credit measurement for each of the curations based on the learning-specific features extracted from the curations items of the curations. In an example embodiment, the curation item learning credit measurement may be calculated according to the following formula:

$$\text{Curation\_Item\_Learning\_Credit}\_i = \Sigma_{m=1}^{INm} \text{Curation\_Item\_Learning\_Score}\_m,$$

where Curation_Item_Learning_Credit_i is the curation item learning credit measurement of the curation i, INm is a total number of curation items in the curation i, and Curation_Item_Learning_Score_m is a curation item learning score of each curation item m in the curation i.

The curation item learning credit measurement module 220 and/or another one of the modules 226 may be further configured to calculate the curation item learning score, or Curation_Item_Learning_Score_m, of each curation item m. The curation item learning score of curation item m may be calculated according to the following formula:

$$\text{Curation\_Item\_Learning\_Score}\_m = \alpha_3 * FM + \beta_3 * ACM + \gamma * SMCM + \gamma * CM,$$

where $\alpha_3$, $\beta_3$, $\gamma$, and $\delta$ are constants, $\alpha_3 + \beta_3 + \gamma + \delta = 1$, FM is a freshness measurement of the curation item m that depends on an age of the curation item m, ACM is an academic credit measurement of the curation item m that depends on an academic impact of the curation item m, SMCM is a social media credit measurement of the curation item m that depends on a social media impact of the curation item m, and CM is a comprehensiveness measurement of the curation item m that depends on a comprehensiveness of the curation item m. Additional details regarding FM, ACM, SMCM, and CM are disclosed in the '996 application previously incorporated herein by reference.

With continued reference to FIG. 2, the ranking module 222 may be configured to rank each of the curations based at least on the corresponding content similarity measurement and the corresponding curation credit measurement. Alternately, the ranking may be further based on one or both of the corresponding curation item credit measurement and the corresponding curation item learning credit measurement. Ranking the curations based on the corresponding content similarity measurement, the corresponding curation credit measurement, the corresponding curation item credit measurement, and the corresponding curation item learning credit measurement may include, for each of the curations, calculating a rank, R_i, of each curation i according to the following formula:

$$R\_i = a * CSM\_i + b * \text{Curation\_Credit}\_i + c * \text{Curation\_Item\_Credit}\_i + d * \text{Curation\_Item\_Learning\_Credit}\_i,$$

where a, b, c, and d are constants or weighting factors, $a+b+c+d=1$, CSM_i is the content similarity measurement for the curation i as already described above, Curation_Credit_i is the curation credit measurement for the curation i as already described above, Curation_Item_Credit_i is the curation item credit measurement for the curation i as already described above, and Curation_Item_Learning_Credit_i is the curation item learning credit measurement for the curation i as already described above.

The foregoing formula for R_i ranks curations based on the content similarity measurement, the curation credit measurement, the curation item credit measurement, and the curation item learning credit measurement. In other embodiments, the formula for R_i may be modified to rank curations based solely on the content similarity measurement and the curation credit measurement, or based solely on the content similarity measurement, the curation credit measurement, and one, but not both, of the curation item credit measurement and the curation item learning credit measurement. Where the curation item credit measurement and the curation item learning credit measurement are omitted from $R\_i$, the values of a, b, c, and d may be selected such that a+b=1 and c=d=0. Where one, but not both, of the curation item credit measurement and the curation item learning credit measurement is omitted from $R\_i$, the values of a, b, c, and d may be selected such that a+b+d=1 and c=0, or a+b+c=1 and d=0.

In an example embodiment, a, b, c, and d may be, respectively, 0.5, 0.2, 0.1, and 0.1_0.5_,0.2_0.1_, _, and _0.1_. Alternately, a, b, c, and d may be initially specified as first values, e.g., at 0.5, 0.2, 0.1, and 0.1, respectively, and may then be refined by machine learning for optimizing the calculated rank $R\_i$. Continuing with the example in which a, b, c, and d are, respectively, 0.5, 0.2, 0.1, and 0.1, $CSM\_i$, $Curation\_Credit\_i$, $Curation\_Item\_Credit\_i$, and $Curation\_Item\_Learning\_Credit\_i$ may be, respectively, 0.089, 0.0534, 0.113, and 0.1159, such that the rank, $R\_i$, may be calculated according to the preceding formula as $R\_i=0.07807$.

With continued reference to FIG. 2, the user profile module 224 may be configured to generate user profiles for the users that communicate with the system 106 to, e.g., submit queries to locate curations. The user profiles may include explicit user profiles, implicit user profiles, or any combination thereof.

Explicit user profiles may include keywords and other input explicitly provided by the users to build a user profile. Such keywords or other input may represent or correspond to topics of interest to the user, for example. In these and other embodiments, the user profile module 224 may guide each user through a process of building a profile, to the extent an explicit profile is desired.

Implicit user profiles may be auto-generated by tracking user activities, such as search activities, click activities, bookmark activities, or the like or any combination thereof. Contents involved in different activities may be assigned different weights. For example, contents from web pages that are bookmarked by a user may be assigned a higher weight than contents pointed to by links that are clicked by the user.

The explicit and/or implicit user profile for each user may be integrated into a text term vector that may be referred to as a user profile vector. When at least some terms in a term vector corresponding to a curation i match at least some terms in the user profile vector, then the weight of the matching terms may be boosted in the content similarity measurement by the content similarity measurement module 210.

Figure 3:
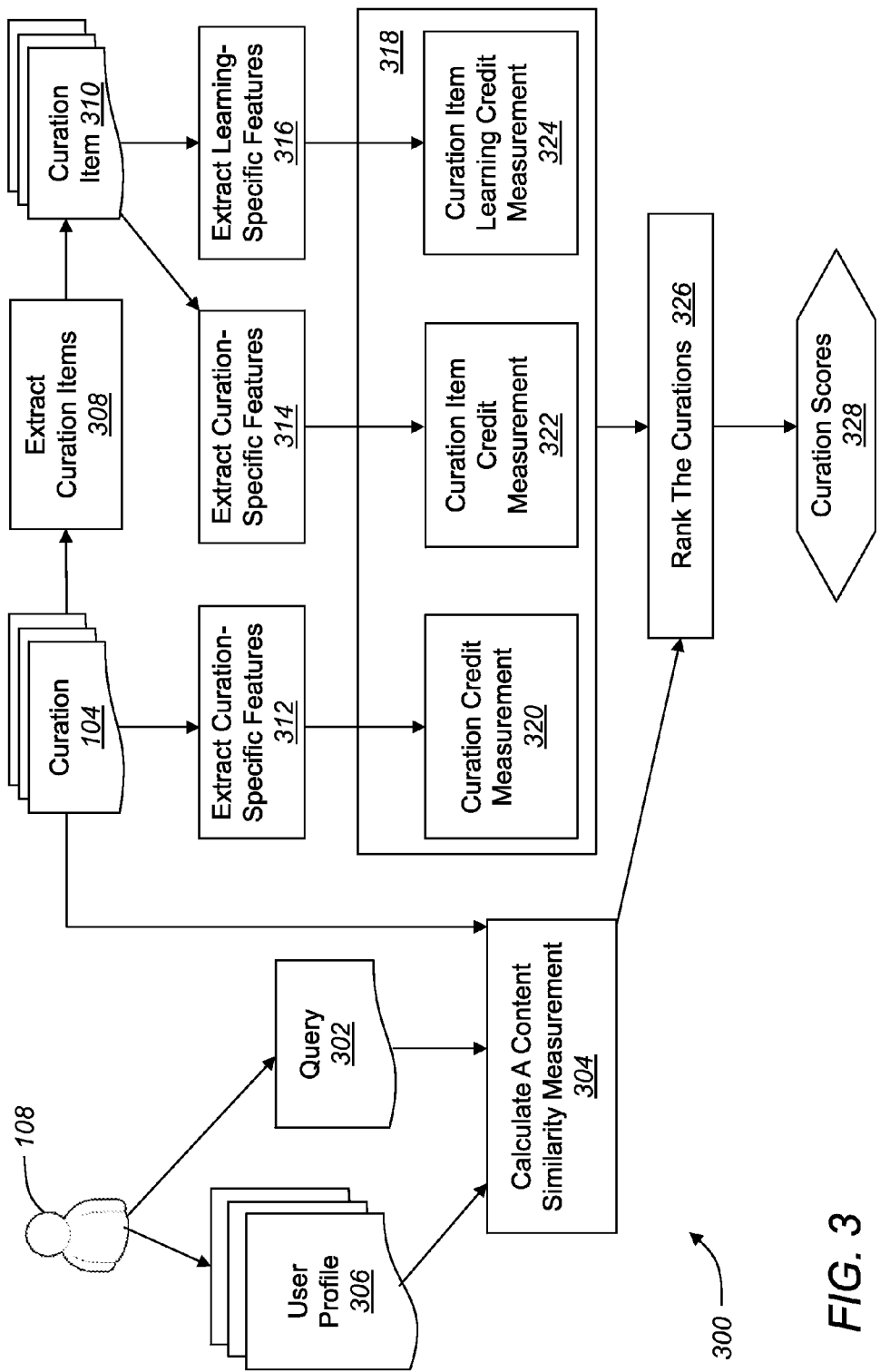
FIG. 3 shows an example flow diagram of a method of ranking curations.

FIG. 3 shows an example flow diagram of a method 300 of ranking curations, arranged in accordance with at least one embodiment described herein. The method 300 in some embodiments is performed by the system 106 of FIGS. 1-2. Although illustrated as discrete blocks, various blocks may be divided into additional blocks, combined into fewer blocks, or eliminated, depending on the desired implementation.

The method 300 may include receiving a query 302 from one of the users 108 searching for a curation. At block 304, a content similarity measurement for each of the curations 104 may be calculated based on the query 302. Optionally, the calculation of the content similarity measurement may be further based on a user profile 306 of the user 108 and/or may be calculated according to the formula for $CSM\_i$ as discussed above. At block 308, curation items 310 may be extracted from the curations 104. At block 312, curation-specific features may be extracted from the curations 104. At block 314, curation-specific features may be extracted from the curation items 310. At block 316, learning-specific features may be extracted from the curation items 310.

At block 318, one or more curation-specific measurements 320, 322, 324 may be calculated for each of the curations 104 based on the extracted curation-specific and/or learning-specific features. In the illustrated embodiment, the one or more curation-specific measurements 320, 322, 324 include at least a curation credit measurement 320 calculated based on the curation-specific features extracted from the curations 104. Alternately or additionally, the one or more curation-specific measurements 320, 322, 324 may include a curation item credit measurement 322 calculated based on the curation-specific features extracted from the curation items 310 and/or a curation item learning credit measurement 324 calculated based on the learning-specific features extracted from the curation items 310. The curation credit measurement 320, the curation item credit measurement 322, and the curation item learning credit measurement 324 for each of the curations 104 may be calculated according to the formulas for, respectively, $Curation\_Credit\_i$, $Curation\_Item\_Credit\_i$, and $Curation\_Item\_Learning\_Credit\_i$ already discussed above. At block 326, the curations 104 are ranked based on the content similarity measurement and the one or more curation-specific measurements to generate a curation score 328 for each of the curations 104. The curations 104 may be ranked according to the formula for $R\_i$ already discussed above.

The curation scores 328 may be output to the user 108. Alternately or additionally, links to the curations 104 and/or short descriptions thereof may be output to the user 108 with an order of the links reflecting the curation scores 328, or the relevancy, of each of the curations 104 with respect to the query 302.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of ranking curations, the method comprising:
   receiving a query;
   calculating, based on the query, a content similarity measurement for each of a plurality of curations, wherein each of the plurality of curations includes a plurality of digital files organized by a curator;
   extracting, from each of the plurality of curations, a plurality of curation-specific features;
   calculating a curation credit measurement for each of the plurality of curations based on the extracted plurality of curation-specific features according to Curation_Credit_i=$\alpha_1$*Curation_Popularity_i+$\beta_1$*Curation_Curator_Credit_i, where Curation_Credit_i is the curation credit measurement of a curation i, $\alpha_1$ and $\beta_1$ are constants, Curation_Popularity_i is a curation popularity credit measurement of the curation i, and Curation_Curator_Credit_i is a curation curator credit measurement of the curation i; and
   ranking each of the plurality of curations based on the corresponding content similarity measurement and the corresponding curation credit measurement.

2. The method of claim 1, wherein the curation credit measurement for each of the plurality of curations depends on a popularity of the corresponding curation and on a popularity and social network influence of a curator of the corresponding curation.

3. The method of claim 1, wherein:
   $\alpha_1+\beta_1=1$;
   the curation popularity credit measurement of the curation i is calculated according to Curation_Popularity_i=V*View_Score_i+B*Bookmark_Score_i+C*Comment_Score_i, where V, B, and C are constants, V+B+C=1, View_Score_i is calculated based on a number of views of the curation i, Bookmark_Score_i is calculated based on a number of bookmarks to the curation i, and Comment_Score_i is calculated based on a number of comments to the curation i; and
   the curation curator credit measurement of the curation i is calculated according to Curation_Curator_Credit_i=$CCP_i$*$SNI_i$, where $CCP_i$ is a curation content popularity of a curator of the curation i, and $SNI_i$ is a social network influence of the curator of the curation i.

4. The method of claim 3, wherein:
   $CCP_i$ is an average of all curation popularity credit measurements corresponding to all curations created by the curator of the curation i; and
   $SNI_i$ is based on a TwitterRank, a PageRank, or a TunkRank of the curator of the curation i.

5. The method of claim 1, further comprising:
   extracting a plurality of curation items from the plurality of curations;
   extracting, from each of the plurality of curation items, a second plurality of curation-specific features; and
   calculating a curation item credit measurement for each of the plurality of curations based on the second plurality of curation-specific features,
   wherein the ranking of each of the plurality of curations is further based on the corresponding curation item credit measurement.

6. The method of claim 5, wherein the curation item credit measurement for each of the plurality of curations depends on a popularity of curation items included in the corresponding curation and on a popularity and social network influence of each curator that has created a curation including any one or more of the curation items included in the corresponding curation.

7. The method of claim 5, wherein:
   the curation item credit measurement is calculated according to Curation_Item_Credit_i=$\sum_{m=1}^{INm}$ Curation_Item_Score_m, where Curation_Item_Credit_i is the curation item credit measurement of a curation i, INm is a total number of curation items in the curation i, and Curation_Item_Score_m is a curation item score of each curation item m in the curation i;
   the curation item score of each curation item m in the curation i is calculated according to Curation_Item_Score_m=$\alpha_2$*Item_popularity_Credit_m+$\beta_2$*Item_Curator_Credit_m, where $\alpha_2$ and $\beta_2$ are constants, $\alpha_2+\beta_2=1$, Item_popularity_Credit_m is a curation item popularity credit measurement of curation item m, and Item_Curator_Credit_m, is an item curator credit measurement of the curation item m;
   the curation item popularity credit measurement of each curation item m is calculated according to Item_popularity_Credit_m=$\sum_{i=1}^{CN}$ Curation_Popularity_i/INi, where CN is a number of curations that each include the curation item m, Curation_popularity_i depends on a popularity of the curation i that includes the curation item m, and INi is a number of curation items included in the curation i; and
   the item curator credit measurement of each curation item m is calculated according to Item_Curator_Credit_m=$\sum_{i=1}^{CN}$ Curation_Curator_Credit_i/INi.

8. The method of claim 5, further comprising:
   extracting, from each of the plurality of curation items, a plurality of learning-specific features; and
   calculating a curation item learning credit measurement for each of the plurality of curations based on the plurality of learning-specific features,
   wherein the ranking of each of the plurality of curations is further based on the corresponding curation item learning credit measurement.

9. The method of claim 8, wherein:
   the curation item learning credit measurement is calculated according to Curation_Item_Learning_Credit_i=$\sum_{m=1}^{INm}$ Curation_Item_Learning_Score_m, where Curation_Item_Learning_Credit_i is the curation item learning credit measurement of a curation i, INm is a total number of curation items in the curation i, and Curation_Item_Learning_Score_m is a curation item learning score of each curation item m in the curation i; and
   the curation item learning score of each curation item m in the curation i is calculated according to Curation_Item_Learning_Score_m=$\alpha_3$*FM+$\beta_3$*ACM+$\gamma$*SMCM+$\delta$*CM, where $\alpha_3$, $\beta_3$, $\gamma$, and $\delta$ are constants, $\alpha_3+\beta_3+\gamma+\delta=1$, FM is a freshness measurement of the curation item m that depends on an age of the curation item m, ACM is an academic credit measurement of the curation item m that depends on an academic impact of the curation item m, SMCM is a social media credit measurement of the curation item m that depends on a social media impact of the curation item m, and CM is a comprehensiveness measurement of the curation item m that depends on a comprehensiveness of the curation item m.

10. The method of claim 8, wherein ranking each of the plurality of curations based on the corresponding content similarity measurement, the corresponding curation credit measurement, the corresponding curation item credit measurement, and the corresponding curation item learning credit measurement comprises, for each of the plurality of curations, calculating a rank of the corresponding curation according to R_i=a*CSM_i+b*Curation_Credit_i+c*Curation_Item_Credit_i+d*Curation_Item_Learning_Credit_i, where:
   R_i is the rank calculated for a curation i;
   a, b, c, and d are constants;
   a+b+c+d=1;
   CSM_i is the content similarity measurement for the curation i;
   Curation_Item_Credit_i is the curation item credit measurement for the curation i; and
   Curation_Item_Learning_Credit_i is the curation item learning credit measurement for the curation i.

11. A system of ranking curations, the system comprising:
   a processor; and
   a non-transitory computer-readable medium communicatively coupled to the processor and having computer-executable instructions stored thereon that are executable by the processor to perform operations comprising:
      receiving a query;
      calculating, based on the query, a content similarity measurement for each of a plurality of curations, wherein each of the plurality of curations includes a plurality of digital files organized by a curator;
      extracting, from each of the plurality of curations, a plurality of curation-specific features;
      calculating a curation credit measurement for each of the plurality of curations based on the extracted plurality of curation-specific features according to Curation_Credit_i=$\alpha_1$*Curation_Popularity_i+$\beta_1$*Curation_Curator_Credit_i, where Curation_Credit_i is the curation credit measurement of a curation i, $\alpha_1$ and $\beta_1$ are constants, Curation_popularity_i is a curation popularity credit measurement of the curation i, and Curation_Curator_Credit_i is a curation curator credit measurement of the curation i; and
      ranking each of the plurality of curations based on the corresponding content similarity measurement and the corresponding curation credit measurement.

12. The system of claim 11, wherein the curation credit measurement for each of the plurality of curations depends on a popularity of the corresponding curation and on a popularity and social network influence of a curator of the corresponding curation.

13. The system of claim 11, wherein:
   $\alpha_1+\beta_1=1$;
   the curation popularity credit measurement of the curation i is calculated according to Curation_Popularity_i=V*View_Score_i+B*Bookmark_Score_i+C*Comment_Score_i, where V, B, and C are constants, V+B+C=1, View_Score_i is calculated based on a number of views of the curation i, Bookmark_Score_i is calculated based on a number of bookmarks to the curation i, and Comment_Score_i is calculated based on a number of comments to the curation i; and
   the curation curator credit measurement of the curation i is calculated according to Curation_Curator_Credit_i=CCP_i*SNI_i, where CCP_i is a curation content popularity of a curator of the curation i, and SNI_i is a social network influence of the curator of the curation i.

14. The system of claim 13, wherein:
   CCP_i is an average of all curation popularity credit measurements corresponding to all curations created by the curator of the curation i; and
   SNI_i is based on a TwitterRank, a PageRank, or a TunkRank of the curator of the curation i.

15. The system of claim 11, wherein the operations further comprise:
   extracting a plurality of curation items from the plurality of curations;
   extracting, from each of the plurality of curation items, a second plurality of curation-specific features; and
   calculating a curation item credit measurement for each of the plurality of curations based on the second plurality of curation-specific features,
   wherein the ranking of each of the plurality of curations is further based on the corresponding curation item credit measurement.

16. The system of claim 15, wherein the curation item credit measurement for each of the plurality of curations depends on a popularity of curation items included in the corresponding curation and on a popularity and social network influence of each curator that has created a curation including any one or more of the curation items included in the corresponding curation.

17. The system of claim 15, wherein:
   the curation item credit measurement is calculated according to Curation_Item_Credit_i=$\Sigma_{m=1}^{INm}$ Curation_Item_Score_m, where Curation_Item_Credit_i is the curation item credit measurement of a curation i, INm is a total number of curation items in the curation i, and Curation_Item_Score_m is a curation item score of each curation item m in the curation i;
   the curation item score of each curation item m in the curation i is calculated according to Curation_Item_Score_m=$\alpha_2$*Item_Popularity_Credit_m+$\beta_2$*Item_Curator_Credit_m, where $\alpha_2$ and $\beta_2$ are constants, $\alpha_2+\beta_2=1$, Item_Popularity_Credit_m is a curation item popularity credit measurement of curation item m, and Item_Curator_Credit_m, is an item curator credit measurement of the curation item m;
   the curation item popularity credit measurement of each curation item m is calculated according to Item_Popularity_Credit_m=$\Sigma_{i=1}^{CN}$Curation_Popularity_i/INi, where CN is a number of curations that each include the curation item m, Curation_Popularity_i depends on a popularity of the curation i that includes the curation item m, and INi is a number of curation items included in the curation i; and
   the item curator credit measurement of each curation item m is calculated according to Item_Curator_Credit_m=$\Sigma_{i=1}^{CN}$Curation_Curator_Credit_i/INi.

18. The system of claim 15, wherein the operations further comprise:
   extracting, from each of the plurality of curation items, a plurality of learning-specific features; and calculating a curation item learning credit measurement for each of the plurality of curations based on the plurality of learning-specific features, wherein the ranking of each of the plurality of curations is further based on the corresponding curation item learning credit measurement.

19. The system of claim 18, wherein:

the curation item learning credit measurement is calculated according to $Curation\_Item\_Learning\_Credit\_i = \sum_{m=1}^{INm} Curation\_Item\_Learning\_Score\_m$, where Curation_Item_Learning_Credit_i is the curation item learning credit measurement of a curation i, INm is a total number of curation items in the curation i, and Curation_Item_Learning_Score_m is a curation item learning score of each curation item m in the curation i; and the curation item learning score of each curation item m in the curation i is calculated according to $Curation\_Item\_Learning\_Score\_m = \alpha_3*FM + \beta_3*ACM + \gamma*SMCM + \delta*CM$, where $\alpha_3$, $\beta_3$, $\gamma$, and $\delta$ are constants, $\alpha_3 + \beta_3 + \gamma + \delta = 1$, FM is a freshness measurement of the curation item m that depends on an age of the curation item m, ACM is an academic credit measurement of the curation item m that depends on an academic impact of the curation item m, SMCM is a social media credit measurement of the curation item m that depends on a social media impact of the curation item m, and CM is a comprehensiveness measurement of the curation item m that depends on a comprehensiveness of the curation item m.

20. The system of claim 18, wherein ranking each of the plurality of curations based on the corresponding content similarity measurement, the corresponding curation credit measurement, the corresponding curation item credit measurement, and the corresponding curation item learning credit measurement comprises, for each of the plurality of curations, calculating a rank of the corresponding curation according to $R\_i = a*CSM\_i + b*Curation\_Credit\_i + c*Curation\_Item\_Credit\_i + d*Curation\_Item\_Learning\_Credit\_i$, where:

R_i is the rank calculated for a curation i;

a, b, c, and d are constants;

a+b+c+d=1;

CSM_i is the content similarity measurement for the curation i;

Curation_Item_Credit_i is the curation item credit measurement for the curation i; and Curation_Item_Learning_Credit_i is the curation item learning credit measurement for the curation i.

* * * * *